Feb. 26, 1952  R. M. BUCKERIDGE  2,586,782
BELT CONVEYER SYSTEM
Filed April 7, 1949
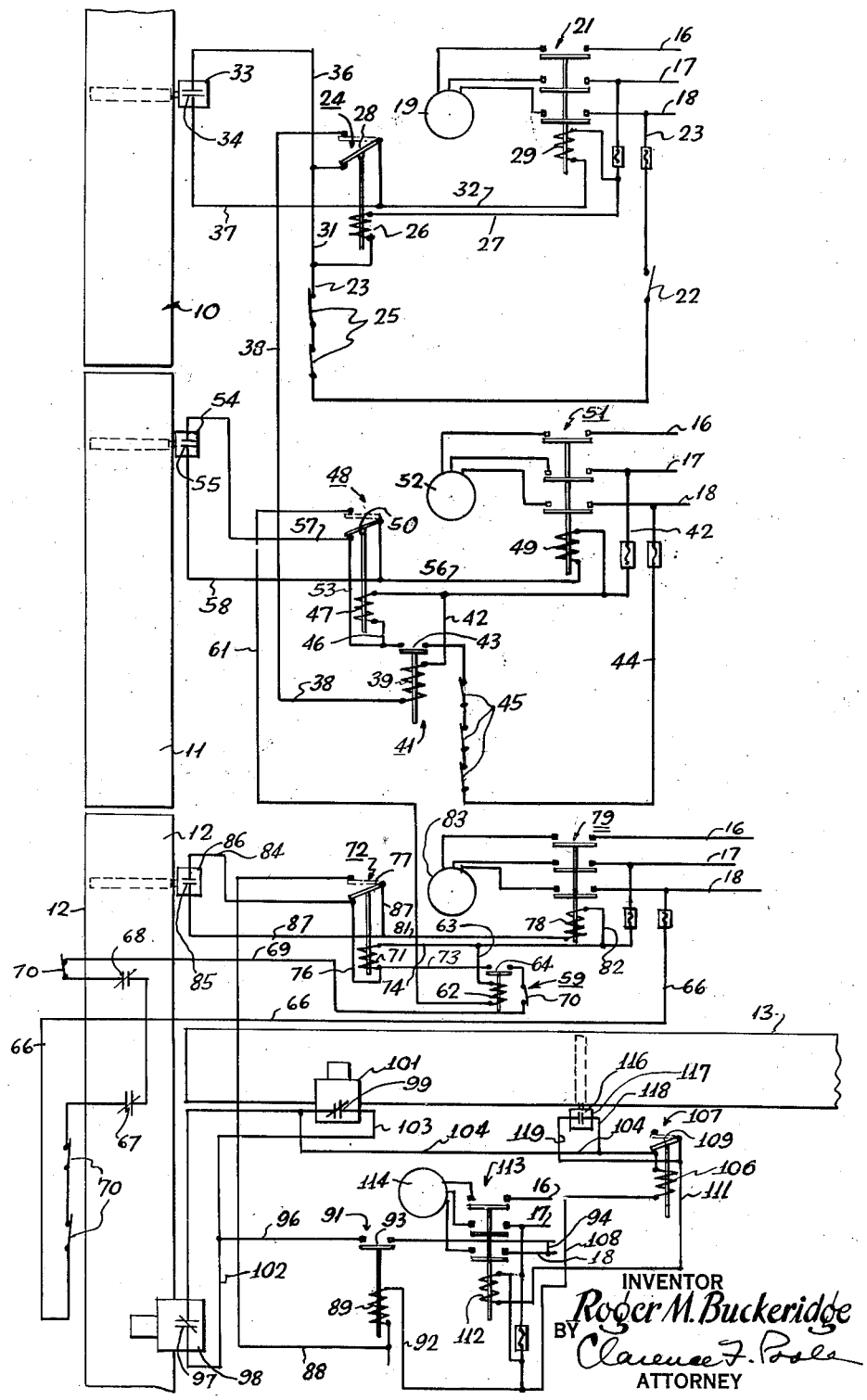
INVENTOR
Roger M. Buckeridge
BY Clarence F. Poole
ATTORNEY Patented Feb. 26, 1952

2,586,782

UNITED STATES PATENT OFFICE 2,586,782

BELT CONVEYER SYSTEM

Roger M. Buckeridge, Chicago, Ill., assignor to Goodman Manufacturing Company, Chicago, Ill., a corporation of Illinois Application April 7, 1949, Serial No. 86,080

15 Claims. (Cl. 198—82)

This invention relates generally to belt conveyor systems and particularly to electrical control systems for such belt conveyors.

Belt conveyor systems are commonly used in mines for the transport of minerals from the working faces to the portal or other parts of the mine. Such conveyors are generally sequentially arranged so that the inby belt discharges onto its adjacent outby belt, and may also be arranged so that a lateral conveyor belt discharges onto a main or gathering conveyor belt. The lateral conveyor belt may also consist of a number of conveyor belt units each sequentially arranged so that an inby belt conveyor unit discharges onto its adjacent outby unit until the last outby unit of such lateral conveyor discharges onto the main or gathering belt conveyor.

In order to reduce the current demand in starting such conveyor units, they are so arranged as to be started sequentially, that is, the outby unit is first started and then brought up to speed, whereupon by a suitable electrical connection from such an outby conveyor unit to its adjacent inby conveyor unit, the adjacent inby conveyor unit may then be started, thus reducing the amount of current which would be required if such conveyor units were started simultaneously. Such sequentially started conveyor units heretofore have not been provided with means for preventing the recycling of the starter control circuit when the inby belt failed to come up to proper running speed after going through the starting cycle. Without such provision for preventing the recycling of the starter control circuit of its associated conveyor unit, it was entirely possible to cause burning of the belt by the friction induced by the slipping contact of the drive roller with the conveyor belt. As a result dangerous fires and explosions have occurred.

Such conveyor belt systems have also been arranged so that a lateral belt unit or a lateral system will discharge onto a main or gathering belt. When the main or gathering belt is loaded and the lateral belt units are discharging their contents onto such a main or gathering belt unit, an undesired amount of spillage may take place at the point of discharge from the lateral belt unit onto the main or gathering conveyor belt units.

With the foregoing considerations in mind it is an object of this invention to enable the outby unit of a belt conveyor system to be started before its adjacent inby unit in order to reduce the current demand which would be occasioned by the simultaneous starting of inby and outby conveyor belt units, and to prevent the recycling of the starter control circuit for such an outby belt if it is not brought up to proper running speed at the conclusion of the starting operation.

A second and further object is to prevent the discharge by a lateral belt conveyor onto the main or gathering conveyor when both conveyor units are loaded.

Yet another object is to enable a lateral conveyor unit to be started as long as such lateral conveyor unit is not loaded at the transfer point, and to start such lateral conveyor unit irrespective of whether the main or gathering unit is in a loaded position.

Still another object is to prevent the discharge by the lateral conveyor unit onto the main or gathering unit when the main or gathering unit is loaded with material at such point of transfer, and when such material is not being moved by the main conveyor because of the bridging of the material across the gathering conveyor belt.

A yet further object is to enable the starting circuit for a conveyor unit to cause the conveyor unit to continue to operate as long as the unit is running at proper speed, but to prevent the recycling of the starter circuit thereof if the speed thereof should drop below a predetermined amount or it should stop for any reason.

Other objects and important features of the invention will be apparent from the following description taken together with the drawings which illustrate a preferred embodiment which the invention may assume in practice, and what is now considered to be the best mode of practicing the invention.

The drawing shows a wiring diagram illustrating a belt conveyor system and a control system therefor according to the present invention.

Referring now to the drawing, there is shown a belt conveyor system consisting of an outby conveyor belt 10 arranged to receive the discharge from an inby conveyor belt unit 11. The conveyor belt unit 11 is in turn arranged to receive the discharge from an additional inby conveyor unit 12. The conveyor belt units 10, 11 and 12 are sometimes referred to as main or gathering belt conveyor units, and one or more units of the main or gathering belt conveyor units 10, 11 and 12 may be arranged to receive the discharge from a lateral or room belt conveyor unit 13.

Each of the conveyor belt units 10, 11 and 12 is arranged to be driven by a motor associated with each, which is supplied with energy from a polyphase supply source including supply mains 16, 17 and 18.

The outby belt conveyor unit 10 is thus adapted to be driven by a motor 19, which is under the control of a starter indicated generally at 21. The starter 21 is under the control of a main starting switch 22 which is connected in a lead 23 and through the emergency switches 25 and across a phase of the polyphase supply source. The closing of the main starter switch energizes a time delay relay 24, having a winding 26 connected in circuit with the lead 23 across one of the phases through a lead 27. When the winding 26 is thus energized contact 28 thereof remains in the position shown in the drawing, to energize a winding 29 of the starter 21, the winding 29 being connected in circuit with a lead 31 branching from the lead 23, through the contact 28, and thence through a lead 32 to the winding 29 and the lead 27. With the solenoid winding 29 of the starter 21 thus energized, the contacts associated therewith will close, thereby supplying energy to the drive motor 19.

The starter 21 of the motor 19 is arranged to be deenergized if the belt conveyor unit 10 is not brought up to a proper or normal running speed at the conclusion of the starting cycle. The time delay relay 24 is so designed to open one contact and close another contact associated therewith at the end of the time delay period. Thus, for example, if at the end of a five-second period after the starter 21 has been closed by operating the main starter switch 22 and the belt conveyor unit 10 has not been brought up to proper speed, the winding 29 of the starter 21 will be deenergized and power will no longer be supplied to the motor 19. If, on the other hand, the conveyor belt unit 10 has been brought up to proper running speed at the end of the starting period, the solenoid 29 of the starter 21 will remain in energized condition and the motor 19 will continue to operate.

Switch means are thus provided which are sensitive to the speed of the outby conveyor belt unit 10, the switch means being so operative as to maintain the circuit through the winding 29 of the starter 21 in closed condition. To this end there is provided a roller switch 33 having contacts 34 which are adapted to be closed when the outby belt conveyor unit 10 is running at proper speed. The roller switch 33 is connected in a lead 36 branching from the lead 31, the circuit through the switch being completed by means of a lead 37 to the lead 32, and thence through the winding 29 of the starter 21. It will be seen that irrespective of the condition of the winding 26 of the time delay relay 24, a circuit will be maintained through the solenoid winding 29 of the starter 21 so long as the main starter switch 22 and emergency switches 25 remain in closed condition and the outby belt conveyor unit 10 has been brought up to proper running speed at the end of the starting period.

Under the condition when the belt has not attained speed and the contacts 34 still remain open, power will continue to be supplied to winding 26 of relay 24 to cause the contact 28 thereof to remain in the dotted line position shown in the drawing, thereby preventing flow of power to energize coil 29 of starter 21. Only by opening the emergency switches 25 or main switch 22 to deenergize the winding 26 can the starter be reenergized.

The closing of the circuit through the roller switch 33 closes a circuit for controlling the operation of the motor associated with the inby belt conveyor unit 11. Thus when the roller switch 33 is closed, a circuit is made which includes the lead 23, the leads 31 and 36, the closed contacts 34 of the roller switch 33, the lead 37, the contact 28 of the time delay relay 24, now in the dotted line position shown, and a lead 38, and thence through a winding 39 of an auxiliary relay 41, the circuit being completed by a lead 42 across a phase comprised of the main power leads 17 and 18.

The energization of the winding 39 of the auxiliary relay 41 closes a circuit including a contact 43 connected in circuit with a lead 44, emergency switches 45, a lead 46 through a winding 47 of a time delay relay 48, and thence across a phase of the supply to the lead 42.

The closing of the contact 43 of the relay 41 also closes a circuit through a solenoid winding 49 of a starter 51 associated with a motor 52 which drives the inby conveyor belt unit 11. With the relay 41 thus energized, a circuit will be made which includes the lead 44, the contact 43, a lead 53, a contact 50 of the time delay relay 48, thence through a lead 56 and through the winding 49 of the starter 51, the circuit being completed to the supply lead 17 by the lead 42. When the winding 49 is thus energized, the contactors associated with the starter 51 will close, and power will be supplied to the motor 52 to drive the inby conveyor belt unit 11.

As with the relay 24 of the outby conveyor belt unit 10, the time delay relay 48 associated with the inby belt conveyor unit 11 is adapted to operate at the end of the starting period of five seconds. Such operation of the relay 48 would normally deenergize the winding 49 of the starter 51, but the winding is maintained in energized condition irrespective of the condition of the time delay relay 48 as long as the inby belt conveyor unit 11 has been brought to proper speed at the end of the starting cycle. The circuit for maintaining the winding 49 in energized condition includes a roller switch 54 having contacts 56 which are closed when the conveyor belt unit has attained proper running speed, the circuit for holding the winding 49 in energized condition then including a lead 57 branching from the lead 53, the closed contact points 55, a lead 58 connecting with the lead 56, and the circuit then being completed through the winding 49 as before when the time delay relay 48 was first energized.

It will be observed that the inby belt conveyor unit 11 was sequentially started, and that the starting cycle for the inby belt unit 11 took place only after the outby belt unit had been brought up to proper running speed. The next inby belt conveyor unit 12 is similarly arranged to be started after the inby belt conveyor unit has been brought up to proper speed. However, the inby conveyor belt unit 12 is arranged to receive the discharge from the lateral belt conveyor 13, and may also be arranged to receive the discharge from other lateral belt conveyors, not shown, which may be spaced inby, or outby, of the point of discharge of the lateral belt conveyor onto the main or gathering unit 12.

As has been explained in Buckeridge application Serial No. 86,079, filed April 7, 1949, for "Conveyor Belt Systems," such points of transfer from a lateral conveyor unit onto a main or gathering conveyor unit are provided with discharge chutes which are arranged to be pivoted and to be swung down about the pivot axis when the lateral conveyor unit is discharging onto the main or gathering conveyor unit. At such times as the lateral unit is not discharging into the gathering unit, a counterweight moves the discharge chute out of position so that material to be transported which has been deposited on the main or gathering belt at points inby of the point of transfer, will not be impeded in any manner by the discharge chute occupying such down position. In order to minimize spillage at the point of transfer of the lateral conveyor unit onto the gathering conveyor unit, switch means are provided which will open the circuit to the motors driving the gathering unit and the lateral unit.

It is likewise desirable that the lateral conveyor unit be so arranged that it will not discharge its contents on the gathering conveyor unit when it is loaded in excess of a predetermined amount, and the lateral conveyor unit is transporting material. Obviously, it is desirable that both the main or lateral units be adapted to start and continue to operate at normal speed as long as either is loaded, or under conditions when neither of said units is loaded at the transfer points, but not when both units are loaded at the transfer point.

To this end, the delayed operation of the relay 48 and the closing of the contacts 55 of the roller switch 54 are adapted to control an auxiliary relay 59 associated with the inby conveyor belt unit 12. Upon operation of the relay 48 and the closing of the contacts 55 of the roller switch 54, a circuit is made which includes leads 44 and 46, the contact 43, leads 53 and 57, closed contact points 55 of the roller switch 54, the lead 58 and the contact 50 of the time delay relay 48, the circuit being completed by a lead 61, then through a winding 62 of the auxiliary relay 59, and thence by a lead 63 to the main power lead 17. The energization of the relay 59 closes a contactor 64, which is in circuit with a lead 66 connected through a normally closed chute switch 67 positioned inby of the point of discharge of the lateral conveyor unit 13 onto the gathering conveyor unit 12, and a normally closed chute switch 68 positioned outby of the point of discharge of the lateral conveyor unit 13 onto the gathering conveyor unit 12, the circuit being completed by a lead 69 and emergency switches 70 and thence through the closed contactors 64 of the relay 59, to energize a winding 71 of a time delay relay 72, the circuit including the winding 71 also including a lead 73 and a lead 74 to the main power lead 17.

The closing of the contactor 64 also passes current through a lead 76 branching from the lead 73 and thence through a contact 77 of the time delay relay 72, the circuit being completed through a winding 78 of a starter 79 associated with the gathering conveyor belt unit 12, and through leads 81 and 82 to the lead 74 and thence to the main supply lead 17.

It will be apparent that when either switch 67 or 68 is opened, or any of the emergency switches 70, that the relay 59 will be deenergized and the circuit through the starter 79 opened to stop the gathering belt conveyor 12. When the point of discharge of the lateral conveyor 13 onto the gathering conveyor is cleared and both chute switches 67 and 68 and emergency switches 70 are closed, the starter circuit to the motor 83 will again be closed.

With the winding 78 of the starter 79 energized the contacts associated therewith will close and power will be supplied to a motor 83 for driving the gathering belt conveyor unit 12. The winding 78 is adapted to be maintained in energized condition to maintain the circuit to the motor 83 in closed condition provided the gathering conveyor belt unit is operating at proper speed at the conclusion of the starting operation. To this end, when the time delay relay 72 operates, an alternate circuit is made through the winding 78 of the relay 79 which includes a lead 84 branching from the lead 76, closed contact points 85 of a roller switch 86, a lead 87 connected to the lead 81, and thence by lead 81 through the winding 78 and the lead 82 to the main power lead 17 across the phase.

When the time delay relay 72 operates at the end of the starting cycle, the lateral belt conveyor unit 13 will be started provided the load condition on the gathering conveyor unit 12 or the lateral conveyor unit is that obtained as described above, and provided also that the gathering conveyor belt unit has been brought to proper running speed at the end of the starting cycle. Thus, when the time delay relay 72 operates, a circuit is made to control the starting of the lateral belt conveyor unit 13, the circuit so made including the lead 66, chute switches 67 and 68, lead 69, closed contactor 64, leads 73 and 76, leads 84 and 87 including closed contact 85 of the roller switch 86, contact 77 of the time delay relay 72, a lead 88, a winding 89 of an auxiliary relay 91, a lead 92 to the power lead 17 across one phase of the power supply. When the winding 89 of the relay 91 is energized, a contact 93 thereof will be closed and a circuit will be made which includes a lead 94, the contact 93, a lead 96, and either or both of parallel circuits which include closed contacts 97 of a load indicator switch 98, or closed contacts 99 of a load indicator switch 101, contact points 97 being connected in a lead 102 branching from the lead 96 and contact points 99 being connected in a lead 103 which also branches from the lead 96, either circuit being completed by a lead 104, a winding 106 of the time delay relay 107, and a lead 108 connected to the lead 92 and to the main supply lead 17. With the relay 107 in the position shown, a circuit will be made including a contact 109, a lead 111, a winding 112 of a starter 113, the circuit through the winding 112 being completed to the lead 92.

When the winding 112 is thus energized the contacts associated with the starter 113 will close a circuit to a motor 114 for driving the lateral belt conveyor unit 13. As with the belt conveyor units 10, 11 and 12, the motor 114 driving the lateral conveyor unit 13 is continued to be supplied with power provided the belt has been brought to proper speed at the end of the starting operation. Since the relay 107 is a time delay relay it will operate five seconds after being energized, and if the belt unit 13 has been brought to proper speed an alternate circuit is made for maintaining winding 112 in energized state. The circuit for maintaining the winding 112 in energized condition includes contact points 116 of a roller switch 117, the contact points 116 being connected in circuit with a lead 118 branching from the lead 104 and a lead 119 connected to the lead 111 and thence through the winding 112, as described above.

It will be apparent that the auxiliary relay 91 will not be energized if the circuit to the starter 79 of the motor 83 is opened since the relay 91 is in circuit with the coil 78 of the starter 79. In such event the starter circuit to the starter 113 will be opened and the motor 114 of the lateral conveyor will not start, or if running, will stop.

It will be seen from the foregoing description that the starter of the motor associated with each of the belt conveyor units cannot be recycled if the belt has not been brought up to proper running speed at the end of the starting operation. Only if the contacts of the roller switch associated with each belt unit are closed, can the driving motor for such a belt continue to operate. If the belt should reduce its speed below a predetermined level, the circuit through the winding of the starter of such belt will be opened and the starter thereby deenergized to open the supply circuit to the motor. Since the starter associated with each belt conveyor unit cannot recycle, there is no danger of mine fires caused by friction of the drive pulleys against the conveyor belts.

According to the present invention a lateral belt conveyor unit cannot be started if both the lateral unit and the gathering conveyor unit are loaded in excess of a predetermined amount at the transfer point. Also, according to the present invention, both the lateral conveyor belt unit and the main or gathering conveyor belt unit into which the lateral unit discharges, are adapted to be stopped if the point of discharge of the lateral unit is clogged by an excess of material, thereby minimizing spillage at such points of transfer.

While the invention has been described in terms of an embodiment which it may assume in practice, its scope is not intended to be limited in terms of the embodiment shown nor otherwise except by the appended claims.

I claim as my invention:

1. In an electrical control circuit for a belt conveyor system consisting of an inby conveyor belt unit adapted to discharge onto an adjacent outby conveyor belt unit, an electric motor associated with each of said belt conveyor units for driving said belt conveyor units, a starter associated with an outby unit including a solenoid operated contactor adapted to be energized during starting and normal running of said outby unit, a time delay relay in circuit with said starter during starting, a switch associated with said outby unit and operable in response to running thereof at normal speed, said switch being adapted to maintain said solenoid operated contactor in energized condition when said time delay relay operates at the end of a starting cycle, and a circuit adapted to be closed upon operation of said time delay relay and upon running at normal speed of said outby unit for controlling the starter of an inby belt conveyor unit.

2. In an electrical control circuit for a belt conveyor system consisting of an inby conveyor belt unit adapted to discharge onto an adjacent outby conveyor belt unit, an electric motor associated with each of said belt conveyor units for driving said belt conveyor units, a starter associated with an outby unit including a solenoid operated contactor adapted to be energized during starting and normal running of said outby unit, a time delay relay in circuit with said starter during starting, a switch associated with said outby unit and having contacts which are closed during running at normal speed of said outby unit, said switch being adapted to maintain said solenoid operated contactor in energized condition when said time delay relay operates at the end of a starting cycle, and a circuit adapted to be closed upon operation of said time delay relay and upon running at normal speed of said outby unit for controlling the starter of an inby belt conveyor unit.

3. In an electrical control circuit for a belt conveyor system consisting of an inby conveyor belt unit adapted to discharge onto an adjacent outby conveyor belt unit, an electric motor associated with each of said belt conveyor units for driving said belt conveyor units, a starter associated with an outby unit including a solenoid operated contactor adapted to be energized during starting and normal running of said outby unit, a time delay relay in circuit with said starter during starting, a switch associated with said outby unit and operable in response to running thereof at normal speed, said switch being adapted to maintain said solenoid operated contactor in energized condition when said time delay relay operates at the end of a starting cycle, and a circuit adapted to be closed upon operation of said time delay relay and upon running at normal speed of said outby unit for controlling a solenoid operated starter of an inby belt of said conveyor unit, said circuit including a relay adapted to be energized upon closing of said circuit and having contactors for completing a circuit through said solenoid of the starter associated with said inby unit.

4. In an electrical control circuit for a belt conveyor system consisting of an inby conveyor belt unit adapted to discharge onto an adjacent outby conveyor belt unit, an electric motor associated with each of said belt conveyor units for driving said belt conveyor units, a starter associated with an outby unit including a solenoid operated contactor adapted to be energized during starting and normal running of said outby unit, a time delay relay in circuit with said starter during starting, a switch associated with said outby unit and operable in response to the running thereof at normal speed, said switch being adapted to maintain said solenoid operated contactor in energized condition when said time delay relay operates at the end of a starting cycle, and a circuit adapted to be closed upon operation of said time delay relay and upon running at normal speed of said outby unit for controlling a solenoid operated starter of an inby belt of said conveyor unit, said circuit including a relay adapted to be energized upon closing of said circuit and having contactors for completing a circuit through said solenoid of the starter associated with said inby unit.

5. In an electrical control circuit for a belt conveyor system consisting of an inby conveyor belt unit adapted to discharge onto an adjacent outby conveyor belt unit, an electric motor associated with each of said belt conveyor units for driving said belt conveyor units, a source supplying polyphase voltage, a starter associated with an outby conveyor belt unit including a solenoid operated contactor connected across a phase of said supply source and adapted to be energized during starting and normal running of said outby unit, a time delay relay in circuit with said starter during starting, a switch associated with said outby unit and operable in response to the normal running speed thereof, said switch being adapted to maintain said solenoid operated contactor in energized condition when said time delay relay operates at the end of a starting cycle, and a circuit adapted to be connected across a phase of said supply source and adapted to be closed upon operation of said time delay relay and upon normal running speed of said outby unit for controlling the starter of an inby belt conveyor unit.

6. In an electrical control circuit for a belt conveyor system consisting of an inby conveyor belt unit adapted to discharge onto an adjacent outby conveyor belt unit, an electric motor associated with each of said belt conveyor units for driving said belt conveyor units, a source supplying polyphase voltage, a starter associated with an outby conveyor belt unit including a solenoid operated contactor connected across a phase of said supply source and adapted to be energized during starting and normal running of said outby unit, a time delay relay in circuit with said starter during starting, a switch associated with said outby unit and having contacts which are closed during the running at normal speed of said outby belt unit, said switch being adapted to maintain said solenoid operated contactor in energized condition when said time delay relay operates at the end of a starting cycle, and a circuit adapted to be connected across a phase of said supply source and adapted to be closed upon operation of said time delay relay and upon running at normal speed of said outby unit for controlling the starter of an inby belt conveyor unit.

7. In an electrical control circuit for a belt conveyor system consisting of an inby conveyor belt unit adapted to discharge onto an adjacent outby conveyor belt unit, an electric motor associated with each of said belt conveyor units for driving said belt conveyor units, a source supplying polyphase voltage, a starter associated with an outby conveyor belt unit including a solenoid operated contactor connected across a phase of said supply source and adapted to be energized during starting and running at normal speed of said outby unit, a time delay relay in circuit with said starter during starting, a switch associated with said outby unit and operable in response to the running thereof at normal speed, said switch being adapted to maintain said solenoid operated contactor in energized condition when said time delay relay operates at the end of a starting cycle, and a circuit connected across a phase of said supply source and adapted to be closed upon operation of said outby unit for controlling a solenoid starter of an inby belt of said conveyor units, said circuit including a relay adapted to be energized upon closing of said circuit and having contactors for completing a circuit through said solenoid of said starter.

8. In an electrical control circuit for a belt conveyor system consisting of an inby conveyor belt unit adapted to discharge onto an adjacent outby conveyor belt unit, an electric motor associated with each of said belt conveyor units for driving said belt conveyor units, a source supplying polyphase voltage, a starter associated with an outby conveyor belt unit including a solenoid operated contactor connected across a phase of said supply source and adapted to be energized during starting and running at normal speed of said outby unit, a time delay relay in circuit with said starter during starting, a switch associated with said outby unit and having contacts which are closed during running at normal speed of said outby belt unit, said switch being adapted to maintain said solenoid operated contactor in energized condition when said time delay relay operates at the end of a starting cycle, and a circuit connected across a phase of said supply source and adapted to be closed upon operation of said outby unit for controlling a solenoid starter of an inby belt of said conveyor units, said circuit including a relay adapted to be energized upon closing of said circuit and having contactors for completing a circuit through said solenoid of said starter.

9. In an electrical control circuit for a belt conveyor system consisting of a gathering conveyor belt unit and a lateral belt conveyor unit adapted to discharge onto said gathering conveyor belt unit, a motor associated with each belt conveyor unit for driving said belt conveyor unit, said gathering conveyor belt unit being adapted to be started before said lateral belt conveyor unit, a starter associated with said lateral belt conveyor unit including a solenoid operated contactor adapted to be energized during starting and running thereof at normal speed, switch means associated with said gathering conveyor unit and operable in response to running at normal speed of said gathering belt conveyor unit, said switch being adapted to control the energization of the solenoid of the starter associated with said lateral belt conveyor unit, a circuit associated with said solenoid of said starter including a load indicator switch associated one each with said belt conveyor units and adapted to maintain the circuit through said solenoid in closed condition when either of said belt conveyor units is loaded below a predetermined amount at the transfer point.

10. In an electrical control circuit for a belt conveyor system consisting of a gathering conveyor belt unit and a lateral belt conveyor unit adapted to discharge onto said gathering conveyor belt unit, a motor associated with each belt conveyor unit for driving said belt conveyor unit, said gathering conveyor belt unit being adapted to be started before said lateral belt conveyor unit, a starter associated with said lateral belt conveyor unit including a solenoid operated contactor adapted to be energized during starting and normal running thereof, switch means associated with said gathering conveyor unit and operable in response to running at normal speed of said gathering belt conveyor unit, said switch being adapted to control the energization of the solenoid of the starter associated with said lateral belt conveyor unit, a circuit having parallel branches associated with the solenoid of said starter, each of said parallel branches including a load indicator switch associated one each with said belt conveyor units and adapted to maintain the circuit through said solenoid in closed condition when either of said belt conveyor units is loaded below a predetermined amount at the transfer point.

11. In an electrical control circuit for a belt conveyor system consisting of a gathering conveyor belt unit and a lateral belt conveyor unit adapted to discharge onto said gathering conveyor belt unit, a motor associated with each belt conveyor unit for driving said belt conveyor unit, said gathering conveyor belt unit being adapted to be started before said lateral belt conveyor unit, a starter associated with said lateral belt conveyor unit including a solenoid operated contactor adapted to be energized during starting and running thereof at normal speed, switch means associated with said gathering conveyor unit and having contacts adapted to be closed at normal running speed of said gathering belt conveyor unit, said switch being adapted to control the energization of the solenoid of the starter associated with said lateral belt conveyor unit, a circuit associated with said solenoid of said starter including a load indicator switch associated one each with said belt conveyor units and adapted to maintain the circuit through said solenoid in closed condition when either of said belt conveyor units is loaded below a predetermined amount at the transfer point.

12. In an electrical control circuit for a belt conveyor system consisting of a gathering conveyor belt unit and a lateral belt conveyor unit adapted to discharge onto said gathering conveyor belt unit, a motor associated with each belt conveyor unit for driving its associated belt conveyor unit, said gathering conveyor belt unit being adapted to be started before said lateral belt conveyor unit, a starter associated with said lateral belt conveyor unit including a solenoid operated contactor adapted to be energized during starting and running thereof at normal speed, switch means associated with said gathering conveyor unit and having contacts adapted to be closed at normal running speed of said gathering belt conveyor unit, said switch being adapted to control the energization of the solenoid of the starter associated with lateral belt conveyor unit, a circuit having parallel branches associated with the solenoid of said starter, each of said parallel branches including a load indicator switch associated one each with said belt conveyor units and adapted to maintain the circuit through said solenoid in closed condition when either of said belt conveyor units is loaded below a predetermined amount at the transfer point.

13. In an electrical control circuit for a belt conveyor system consisting of a gathering conveyor belt unit and a lateral conveyor belt unit adapted to discharge onto said gathering conveyor belt unit, a motor associated with each belt conveyor unit for driving said belt conveyor unit, a starter associated with said gathering belt conveyor unit including a solenoid operated contactor adapted to be energized during starting and normal running thereof, a source of power for said motors, a starter associated with said lateral belt conveyor unit including a solenoid operated contactor adapted to be energized during starting and running thereof at normal speed, a circuit including means responsive to the normal operating speed of said gathering belt conveyor for controlling said last named starter, and first and second switch means located at points outby and inby of the point of transfer from said lateral belt conveyor unit to said gathering belt unit and being operable responsive to loading in excess of a predetermined amount at either of said outby or inby points for deenergizing the starters of both of said motors.

14. In an electrical control circuit for a belt conveyor system consisting of a gathering conveyor belt unit and a lateral conveyor belt unit adapted to discharge onto said gathering conveyor belt unit, a motor associated with each belt conveyor unit for driving said belt conveyor unit, a starter associated with said gathering belt conveyor unit including a solenoid operated contactor adapted to be energized during starting and normal running thereof, a source of power for said motors, a starter associated with said lateral belt conveyor unit including a solenoid operated contactor adapted to be energized during starting and running thereof at normal speed, a circuit including the first-mentioned solenoid operated contactor for controlling said last named starter, said circuit including means responsive to the normal operating speed of said gathering belt conveyor unit for controlling the energization of said last named solenoid operated contactor, and first and second switch means located at points outby and inby of the point of transfer from said lateral belt conveyor unit to said gathering belt unit and being operable responsive to loading in excess of a predetermined amount at either of said outby or inby points for deenergizing the starters of both of said motors.

15. In an electrical control circuit for a belt conveyor system consisting of a gathering belt conveyor unit and a lateral belt conveyor unit adapted to discharge onto said gathering belt conveyor unit, an electric motor associated with each of said belt conveyor units for driving said belt conveyor units, a starter associated with said gathering belt conveyor unit including a solenoid operated contactor adapted to be energized during starting and normal running of said gathering belt conveyor unit, a time delay relay in circuit with said starter during starting, a switch associated with said gathering belt conveyor unit and operable in response to the normal running speed thereof, a source of power for said motors, a circuit adapted to be closed upon operation of said time delay relay and upon operation of said switch, a solenoid operated starter for said lateral belt conveyor unit, said circuit including a relay adapted to be energized upon closing of said circuit and having contactors for completing a circuit through said solenoid of the starter associated with said lateral belt conveyor unit, and switch means operable upon loading in excess of a predetermined amount of said gathering belt conveyor unit at points outby and inby of the point of transfer from said lateral belt conveyor unit for deenergizing the starter of each of said motors.

ROGER M. BUCKERIDGE.

REFERENCES CITED

The following references are of record in the file of this patent:

UNITED STATES PATENTS

| Number | Name | Date |
| --- | --- | --- |
| 1,044,609 | Watson | Nov. 19, 1912 |
| 1,620,531 | Fisher | Mar. 8, 1927 |
| 1,907,089 | Pabst | May 2, 1933 |
| 2,060,755 | Exner | Nov. 10, 1936 |